2,992,123
YELLOW CERAMIC PIGMENTS
Clarence A. Seabright, Lakewood, Ohio, assignor to The Harshaw Chemical Company, Cleveland, Ohio, a corporation of Ohio
No Drawing. Filed Apr. 20, 1959, Ser. No. 807,274
18 Claims. (Cl. 106—299)

This invention relates to ceramic pigments and especially to a novel class of yellow pigments containing zirconium and praseodymium.

It has now been discovered in accordance with the present invention that by calcining together an intimate mixture of oxides of zirconium and praseodymium suitably, $ZrO_2$ and $Pr_6O_{11}$, or compounds capable of yielding these on calcination, such as praseodymium chloride, nitrate, oxalate, oxide, fluoride, sulfate and carbonate, pleasing yellow pigments can be formed. Further, by including silica along with the oxides of zirconium and praseodymium, exceptionally clean yellow pigments can be obtained. If no silica is included, the pigments are pleasing orange yellows whereas the compositions including silica tend to increase in brightness with the amount of silica up to an optimum and then gradually to fade somewhat as the silica passes the optimum proportion and begins to act as a diluent. The compositions containing silica are attractive, lemon yellow pigments. The optimum proportions are approximately those shown in Table I below, e.g., Example I of Table I.

The pigments according to the present invention are useful as glaze, body and underglaze stains.

The constituent oxides of the calcined pigments in a close state of chemical or physical association may be present in the following proportions in parts by weight:

$ZrO_2$ from 99.9 to 30.0
$SiO_2$ from 70.0 to 0.0
$Pr_6O_{11}$ from 0.1 to 10.0

Preferably, they should be present in the following proportions in parts by weight:

$ZrO_2$ from 99.0 to 40.0
$SiO_2$ from 20.0 to 40.0
$Pr_6O_{11}$ from 5.0 to 0.5

In addition to the above ingredients, it is desirable to have present a flux. Suitable fluxes are the fluorides and carbonates of lithium, sodium, potassium and barium. Other fluxes may be used. If used, the flux may suitably be employed in proportion up to 10%, preferably from 1% to 5%, percentages being by weight.

The ingredients are mixed very intimately and calcined to a temperature from 800° C. to 1500° C., preferably from 1100° C. to 1300° C. The atmosphere of calcination should be oxidizing or at least non-reducing. Very intimate mixtures may be obtained by bringing the $ZrO_2$ and any other ingredients together with a solution of a praseodymium salt with good mixing, e.g. a water solution of the chloride. Use of soluble praseodymium salts, such as the chloride or nitrate, in solution is desirable in producing an intimate mixture. In such cases the mixture is dried and powdered prior to calcination.

It may be that the constituent oxides undergo changes during calcination such as two or more of them reacting with each other or undergoing changes of valence. For example, $Pr_6O_{11}$ may be oxidized to $PrO_2$. Such changes are to be considered within the scope of the invention and it is to be understood that the foregoing statements of proportions are based upon batch formulation and do not necessarily shown the exact composition of the calcined pigments. In the claims, where pigment composition is stated, it is to be understood that such claims include within their scope the calcination products of the ingredients in the proportions stated.

Pigments according to the invention have pleasing yellow colors which at optimum are very clean and strong. Examples are shown in Table I below, proportions being in parts by weight:

Table I

| | 1 | 2 | 3 | 4 | 5 | 6 | 7 | 8 | 9 |
|---|---|---|---|---|---|---|---|---|---|
| $PrCl_3$ | 2.9 | 2.9 | 2.9 | 2.9 | | 2.9 | 2.9 | 2.9 | 2.9 |
| $Pr_6O_{11}$ | | | | | 2.0 | | | | 95 |
| $ZrO_2$ | 65 | 65 | 65 | 65 | 65 | 95 | 85 | 95 | |
| $SiO_2$ | 30 | 30 | 30 | 30 | 30 | | 10 | | |
| NaF | 3 | | | | 3 | | | | |
| $Na_2CO_3$ | | 4 | | | | 2 | 2 | | |
| $Li_2CO_3$ | | | 4 | | | | | | |
| $K_2CO_3$ | | | | 4 | | | | | |
| $BaCO_3$ | | | | | | | | 2 | |
| Temp. | 1,200° C. | 1,200° C. | 1,200° C. | 1,200° C. | 1,200° C. | 1,300° C. | 1,300° C. | 1,300° C. | 1,300° C. |
| Color | Yellow | Yellow | Lt. Yellow | Yellow | Lt. Yellow | Orange Yellow | Lt. Orange Yellow | Brown Yellow | Light Yellow |

What I claim is:
1. Pigment compositions, being calcination products and consisting essentially of from 99.9 to 30 parts by weight of oxides of zirconium and from 0.1 to 10.0 parts by weight of oxides of praseodymium.

2. Process of making a clean yellow pigment comprising calcining in a nonreducing atmosphere at temperatures in the range from 1100° C. to 1500° C. a batch consisting essentially of materials capable of yielding from 99.9 to 30 parts by weight of oxides of zirconium and from 0.1 to 10.0 parts by weight of oxides of praseodymium.

3. Pigment compositions, being calcination products and consisting essentially of oxides of from 99.9 to 30 parts by weight of zirconium from 70.0 to 0.0 parts by weight of oxides of, silicon, and from 0.1 to 10.0 parts by weight of oxides of praseodymium.

4. Process of making a clean yellow pigment comprising calcining in a nonreducing atmosphere at temperatures in the range from 1100° C. to 1500° C. a batch consisting essentially of materials capable of yielding 99.9 to 30 parts by weight of oxides of zirconium from 70.0 to 0.0 parts by weight of, silicon and from 0.1 to 10.0 parts by weight of oxides of praseodymium.

5. Pigment compositions being calcination products and consisting essentially of oxides of zirconium and praseodymium in proportions in parts by weight of zirconium oxide 99.9 to 30 and praseodymium oxide from 0.1 to 10.

6. Process of making a clean yellow pigment comprising calcining in a nonreducing atmosphere at temperatures in the range from 1100° C. to 1500° C. a batch consisting essentially of materials capable of yielding oxides of zirconium and praseodymium in proportions in parts by weight of zirconium oxide 99.9 to 30 and praseodymium oxide from 0.1 to 10.

7. Pigment compositions, being calcination products and consisting essentially of oxides of zirconium, silicon, and praseodymium in proportions in parts by weight of zirconium oxide 99.9 to 30, silica from 0 to 70 and praseodymium oxide from 0.1 to 10.

8. Process of making a clean yellow pigment comprising calcining in a nonreducing atmosphere at temperatures in the range from 1100° C. to 1500° C. a batch consisting essentially of materials capable of yielding oxides of zirconium, silicon and praseodymium in proportions in parts by weight of zirconium oxides 99.9 to 30, silica 70 to 0 and praseodymium oxide from 0.1 to 10.

9. Pigment compositions, being calcination products and consisting essentially of oxides of zirconium and praseodymium in proportions in parts by weight of zirconium oxide 99 to 40, and praseodymium oxide from 5.0 to 0.5.

10. Process of making a clean yellow pigment comprising calcining in a nonreducing atmosphere at temperatures in the range from 1100° C. to 1500° C. a batch consisting essentially of materials capable of yielding oxides of zirconium and praseodymium in proportions in parts by weight of zirconium oxide 99 to 40, and praseodymium oxide from 5.0 to 0.5.

11. Pigment compositions, being calcination products and consisting essentially of oxides of zirconium, silicon, and praseodymium, in proportions in parts by weight of zirconium oxide from 99 to 40, silica from 20 to 40 and praseodymium oxide from 5.0 to 0.5.

12. Process of making a clean yellow pigment comprising calcining in a nonreducing atmosphere at temperatures in the range from 1100° C. to 1500° C. a batch consisting essentially of materials capable of yielding oxides of zirconium, silicon and praseodymium in proportions in parts by weight of zirconium oxide 99 to 40, silica 20 to 40 and praseodymium oxide from 5.0 to 0.5.

13. Process of making a clean yellow pigment comprising calcining in a nonreducing atmosphere at temperatures in the range from 1100° C. to 1500° C. a batch consisting essentially of materials capable of yielding oxides of zirconium, silicon and praseodymium, said batch also including a flux.

14. Process of making a clean yellow pigment comprising calcining in a nonreducing atmosphere at temperatures in the range from 1100° C. to 1500° C. a batch consisting essentially of materials capable of yielding oxides of zirconium, silicon and praseodymium in proportions in parts by weight of zirconium oxide 99 to 30, silica 70 to 0 and praseodymium oxide from 0.1 to 10, said batch also including up to 10% of a flux.

15. Process of making a clean yellow pigment comprising calcining in a nonreducing atmosphere at temperatures in the range from 1100° C. to 1500° C. a batch consisting essentially of materials capable of yielding oxides of zirconium, silicon and praseodymium in proportions in parts by weight of zirconium oxide 99 to 40, silica 20 to 40 and praseodymium oxide from 5.0 to 0.5, said batch also including up to 10% of a flux.

16. Process of making a clean yellow pigment comprising calcining in a nonreducing atmosphere at temperatures in the range from 1100° C. to 1500° C. a batch consisting essentially of materials capable of yielding oxides of zirconium and praseodymium, said batch also including up to 10% of a flux.

17. Process of making a clean yellow pigment comprising calcining in a nonreducing atmosphere at temperatures in the range from 1100° C. to 1500° C. a batch consisting essentially of materials capable of yielding oxides of zirconium and praseodymium in proportions in parts by weight of zirconium oxide 99.9 to 30 and praseodymium oxide from 0.1 to 10, said batch also including up to 10% of a flux.

18. Process of making a clean yellow pigment comprising calcining in a nonreducing atmosphere at temperatures in the range from 1100° C. to 1500° C. a batch consisting essentially of materials capable of yielding oxides of zirconium and praseodymium in proportions in parts by weight of zirconium oxide 99 to 40, silica from 20 to 40 and praseodymium oxide from 5.0 to 0.5, said batch also including up to 10% of a flux.

References Cited in the file of this patent

UNITED STATES PATENTS

| | | |
|---|---|---|
| 2,068,294 | Korinth et al. | Jan. 19, 1937 |

FOREIGN PATENTS

| | | |
|---|---|---|
| 384,473 | Great Britain | Dec. 8, 1932 |
| 809,296 | France | Feb. 27, 1937 |
| 499,883 | Canada | Feb. 9, 1954 |
| 5,239 | Japan | Aug. 21, 1954 |